United States Patent
Nguyen et al.

(10) Patent No.: US 11,503,068 B1
(45) Date of Patent: *Nov. 15, 2022

(54) SESSION MANAGEMENT

(71) Applicant: Wells Fargo Bank, N.A., San Francisco, CA (US)

(72) Inventors: Traci H. Nguyen, San Francisco, CA (US); Nairobi N. Kim, Piedmont, CA (US); Ian Jensen, Oakland, CA (US); Upul Hanwella, San Francisco, CA (US); Brian J. Hanafee, Pleasanton, CA (US); Christopher Wayne Howser, Concord, NC (US); Ajay Panikkar, Sunnyvale, CA (US); Michael Chang, Millbrae, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,285

(22) Filed: Mar. 15, 2019

Related U.S. Application Data

(63) Continuation of application No. 14/694,084, filed on Apr. 23, 2015, now Pat. No. 10,237,298.

(60) Provisional application No. 62/013,298, filed on Jun. 17, 2014.

(51) Int. Cl.
*H04L 9/40* (2022.01)
*H04L 67/14* (2022.01)

(52) U.S. Cl.
CPC ...... *H04L 63/1441* (2013.01); *H04L 63/1408* (2013.01); *H04L 67/14* (2013.01)

(58) Field of Classification Search
CPC .. H04L 63/1441; H04L 63/1408; H04L 67/14
See application file for complete search history.

(56) References Cited

U.S. PATENT DOCUMENTS

| | | |
|---|---|---|
| 6,434,607 B1 | 8/2002 | Haverstock et al. |
| 8,793,255 B1 | 7/2014 | Bilinski et al. |
| 8,959,633 B1 * | 2/2015 | Dokey ............... G06F 21/50 705/30 |
| 9,213,990 B2 | 12/2015 | Adjaoute |
| 2003/0101116 A1 | 5/2003 | Rosko et al. |
| 2003/0225612 A1 | 12/2003 | Desimone et al. |
| 2006/0059341 A1 | 3/2006 | Dharmadhikari et al. |
| 2007/0079136 A1 | 4/2007 | Vishik et al. |
| 2008/0028463 A1 | 1/2008 | Dagon et al. |
| 2008/0134329 A1 | 6/2008 | Perreault et al. |

(Continued)

*Primary Examiner* — Mohammed Waliullah
(74) *Attorney, Agent, or Firm* — Kilpatrick Townsend & Stockton LLP

(57) ABSTRACT

One or more embodiments of techniques or systems for session management, security scoring, and friction management are provided herein. Sessions may be monitored for commonalities or other attributes or aspects and closed, terminated, or a freeze placed on additional sessions from being initiated. A security score may be provided which is indicative of how secure a user is with respect to one or more ways the user interacts with a resource. One or more suggested actions or score improvement strategies may be suggested to facilitate improvement of a security score for a user. Friction management may be provided by having one or more additional layers of security applied to an account of a user or an entity based on suspicious behavior or other factors.

20 Claims, 9 Drawing Sheets

(56) References Cited

U.S. PATENT DOCUMENTS

| | | |
|---|---|---|
| 2008/0189164 A1 | 8/2008 | Wiseman et al. |
| 2010/0229223 A1* | 9/2010 | Shepard .................. G06F 21/31 726/5 |
| 2010/0299292 A1* | 11/2010 | Collazo ................. G06F 21/577 706/14 |
| 2011/0191847 A1 | 8/2011 | Davis et al. |
| 2012/0054826 A1 | 3/2012 | Asim et al. |
| 2014/0173738 A1 | 6/2014 | Condry et al. |
| 2014/0201841 A1 | 7/2014 | Deshpande et al. |
| 2015/0026061 A1 | 1/2015 | Siegel et al. |
| 2015/0058950 A1 | 2/2015 | Miu |
| 2015/0101048 A1 | 4/2015 | Sridhara et al. |
| 2015/0128219 A1 | 5/2015 | Guday et al. |
| 2015/0188800 A1 | 7/2015 | MacDonald et al. |
| 2015/0310205 A1 | 10/2015 | Pruthi et al. |
| 2016/0005029 A1 | 1/2016 | Ivey et al. |

\* cited by examiner

SESSION MANAGEMENT

CROSS-REFERENCE TO RELATED APPLICATIONS

This application is a continuation of U.S. patent application Ser. No. 14/694,084, filed Apr. 23, 2015, (issued Mar. 19, 2019 as U.S. Pat. No. 10,237,298) and entitled "Session Management," which claims priority to U.S. Provisional Application No. 62/013,298, filed Jun. 17, 2014, and entitled "SESSION MANAGEMENT, SECURITY SCORING, AND FRICTION MANAGEMENT," the entirety of these applications is expressly incorporated herein by reference.

This application is also related to U.S. patent application Ser. No. 14/694,144, entitled "SECURITY SCORING", filed on Apr. 23, 2015 and U.S. patent application Ser. No. 14/694,436, entitled "FRICTION MANAGEMENT", filed on Apr. 23, 2015, (issued May 7, 2019 as U.S. Pat. No. 10,284,573). The entirety of the above-noted application(s) are incorporated by reference herein.

BACKGROUND

Generally, malicious activity, such as identity theft may allow fraudsters or criminals to setup accounts or utilize accounts to perpetrate one or more activities, such as charging orders for products, transferring funds, or performing denial of service attacks (e.g., penny transfers, etc.). Further, fraud may be difficult to detect because users or entities may not be aware of any issues until a fraudster or criminal racks up substantial charges and creditors approach the entity to collect. Fraudsters or criminals may initiate denial of service attacks utilizing one or more sessions because some sessions may be initiated without authenticating, such as a session utilized to apply for a credit card (e.g., a credit card application). In some scenarios, malicious activity may occur when an agent or fraudster gains control of a session, manipulates a session, opens a plurality of sessions, etc.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One or more embodiments of techniques or systems for session management are provided herein. Generally, a user or an entity may have authentication credentials, such as a username and password. Often, multiple instances or multiple sessions may be initiated using the same authentication credentials in a concurrent fashion. In other words, a user may login to an account on a first device and login to the same account concurrently on a second device, while the first device has the account open for access. Although strict limits may be imposed or implemented, such as by denying sessions over a threshold number of sessions from being created, it may be desirable to manage sessions or web-based sessions in a more flexible, intelligent manner.

For example, web-based sessions or sessions may be monitored. Data from respective sessions may be analyzed to determine or establish one or more session behavior profiles for one or more of the sessions. A session behavior profile may be indicative of session patterns, behavior baselines, expected behaviors, known malicious behaviors, potentially malicious behaviors, etc. In other words, a session behavior profile may be representative of a comparison of current behavior associated with a set of login or authentication credentials and expected behavior (e.g., baseline behavior) or a comparison between current behavior and malicious behavior. In this way, a system for session management may compare a user, an entity, actions associated therewith, etc. with 'good' behavior and 'bad' behavior. Additionally, one or more sessions may be identified as in accordance with baseline behavior, having malicious signatures or significantly matching malicious behavior, unknown, or as an anomalous session. In response to an anomalous session, one or more additional sessions may be denied or one or more of the existing sessions may be terminated. In this way, session management may be provided and malicious or potentially malicious activity may be detected and mitigated, thereby minimizing potential losses or damage.

One or more embodiments of techniques or systems for security scoring are provided herein. One or more interactions between a user and a resource may be monitored. Data associated with one more of these interactions may be extracted and analyzed. For example, if a computer virus is going around which takes advantage of a software vulnerability, data associated with the interactions of the user may be received which is indicative of a software version the user is utilizing. To this end, a security score may be calculated based on the data associated with the user interactions. In this example, a user utilizing a software version associated with the software vulnerability would receive a lower score than another user with a different software version that is not associated with the vulnerability. Further, the data may include user selected attributes, configuration attributes, user interactions, potential threats, or current malware trends. Suggestions or suggested actions may be provided regarding ways a user could improve his or her security score.

One or more embodiments of techniques or systems for friction management are provided herein. For example, a user may be provided with one or more opportunities to layer one or more additional levels of security for an account of the user. When credentials associated with a user are utilized to initiate action or activity, traffic associated with this activity may be deemed or classified as malicious, non-malicious, etc. This enables the system to manage the traffic in a corresponding manner. For example, when a user attempts to interact with a resource or portions of his or her account in a different manner than usual, 'friction' may be applied. In other words, additional security may be applied even after a user has passed authentication (e.g., with a proper username and password). Users who opt-in to additional levels of security may benefit by being provided with a connection which has more bandwidth or passively by not being throttled, as other users (e.g., who have refused to opt-in) may experience.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not

DETAILED DESCRIPTION

Figure 1:
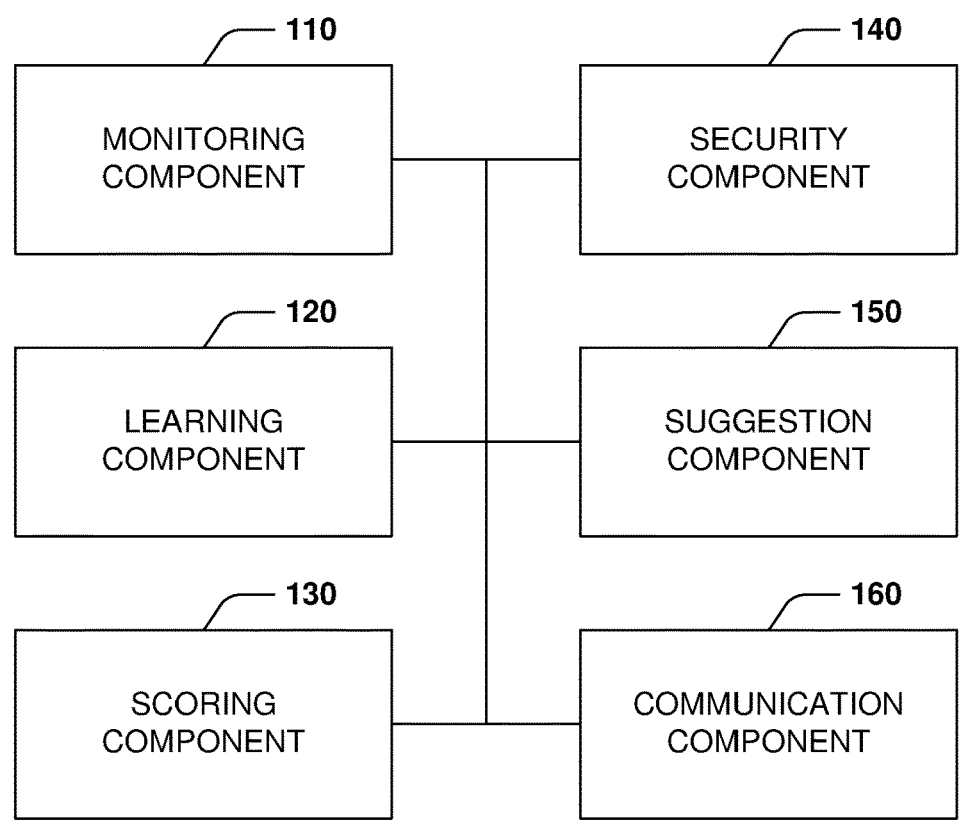
FIG. 1 is an illustration of an example schematic diagram of a system for session management, according to one or more embodiments.

Embodiments or examples, illustrated in the drawings, are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 9:
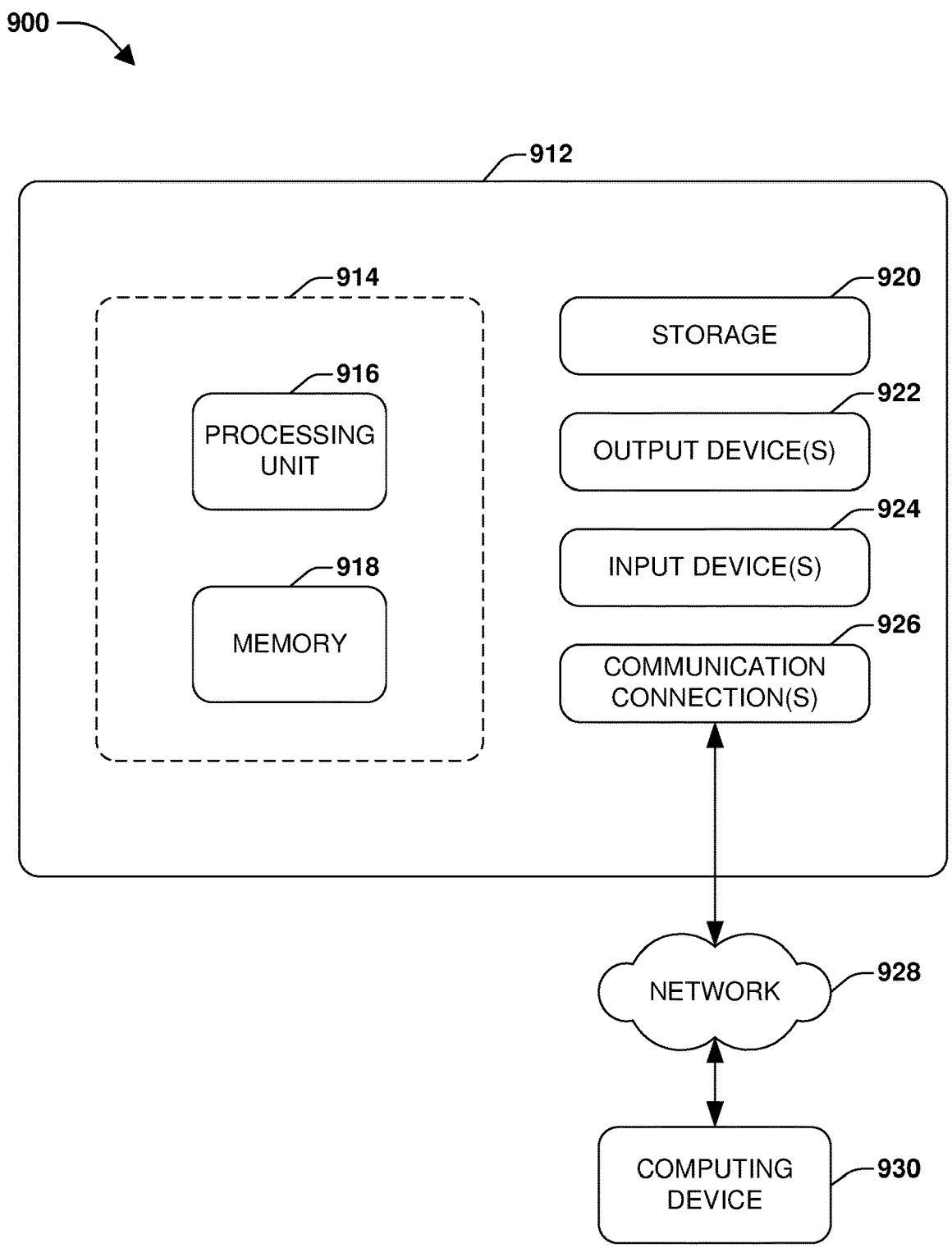
FIG. 9 is an illustration of an example computing environment where one or more of the provisions set forth herein are implemented, according to one or more embodiments.

For one or more of the figures herein, one or more boundaries, such as boundary 914 of FIG. 9, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The following terms are used throughout the disclosure, the definitions of which are provided herein to assist in understanding one or more aspects of the disclosure.

As used herein, the term "entity" may include a user, an individual, a customer, an account owner, a business, a corporation, an enterprise, an organization, an employer, a party, etc. For example, a user may access a resource or a web resource with a set of authentication credentials. It will be appreciated that one or more users or a group of users may be considered an entity. For example, a husband and a wife (e.g., or other family members) may utilize or share a common username and password combination, set of login credentials, or a set of authentication credentials. In other aspects, a group of individuals may utilize a common username and password.

As used herein, the term data may include metrics, information, patterns, usage, usage patterns, traffic, internet protocol (IP) addresses, usage history, pathway information, etc.

As used herein, activity, behavior, and the like may be utilized interchangeably. Additionally, a resource may be web based, a web based resource, a server, a website, a website application, etc.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest can be performed based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an example schematic diagram of a system 100 for session management, according to one or more embodiments. The system 100 may include a monitoring component 110, a learning component 120, a scoring component 130, a security component 140, a suggestion component 150, and a communication component 160. In one or more embodiments, a system, such as the system 100, may include one or more additional components, such as one or more databases, one or more servers, one or more applications, one or more web applications, one or more resources, a storage component (not shown), etc. The system 100 for session management may enable an entity, such as an organization controlling a resource (e.g., a website or a server), to manage, control, terminate, mitigate, etc. one or more sessions, such as sessions or web-based sessions opened under the same authentication credentials or username and password, for example. In other words, the system 100 may identify anomalous sessions associated with a user or a set of authentication credentials or login credentials and terminate sessions associated with the set of authentication credentials or deny additional sessions associated with the same set of authentication credentials from being opened or initiated. Explained another way, concurrent web-based sessions associated with a user may be terminated when suspicious activity or suspicious behavior is detected (e.g., which is associated with the user, entity, authentication credentials, etc.). In other aspects, further or additional web-based sessions initiated by or associated with the user may be denied.

The monitoring component 110 may analyze data associated with one or more sessions. In one or embodiments, the monitoring component 110 may analyze data associated with two or more web-based sessions associated with a user or an entity. For example, the data associated with a user session may be indicative of data siphoning. In this way, the monitoring component 110 may detect session activity that is malicious. The monitoring component 110 may detect or receive data associated with one or more of the sessions. For example, the monitoring component 110 may receive, among other things, a rate at which sign-ons occur. In other words, the monitoring component 110 may detect a number of user sign-ons associated with authentication credentials of an account, user, entity, etc. over a period of time.

Explained another way, the monitoring component 110 may collect data associated with a user sessions and an action may be invoked to terminate traffic when malicious activity is detected. The monitoring component 110 may track or detect current activity of a user or an entity. In this way, system resources may be protected and draining of resources may be mitigated by determining which sessions or open sessions are not legitimate. For example, when a denial of service attack occurs, most any impact on users may be lessened or mitigated.

When a user or an entity accesses a web-based resource or resource, such as a website, a server, a web application, etc., a "session" that contains input from the user and information about the user may be created. The session may be unique to the user or the entity, and often contains private information about the user or entity, such as authentication credentials. A session may be a web-based session. Additionally, a session or a web-based session may be associated with an entity (e.g., where the entity, user, etc. opens the session utilizing a set of authentication credentials or login credentials).

The learning component 120 may establish one or more session behavior profiles for one or more sessions. A session behavior profile may be indicative of one or more baseline or expected behaviors associated with a user or an entity. For example, the learning component 120 may generate the session behavior profile or otherwise determine one or more of the baseline behaviors or one or more of the expected behaviors for a user or an entity associated with an account, a set of login credentials, or a set of authentication credentials by recording activity or behavior which is deemed non-anomalous, similar to existing baseline activity, or similar to existing baseline behaviors. The learning component 120 may thus evolve one or more session behavior profiles as a user or entity changes, modifies, or adjusts his or her habits, for example. In one or more embodiments, the learning component 120 may dynamically update one or more of the session behavior profiles based on one or more machine learning techniques.

The learning component 120 may generate one or more session behavior profiles by analyze or compiling historical data or information collected or associated with a user or an entity. Examples of such data may include habits, browsing history, browsing pathways, navigation style, mouse click style, internet protocol (IP) addresses, time of day, day of week, geographical locations, transaction types, transaction amounts, access frequency, device type (device utilized to sign-on or sign-in), number sessions, session length, etc. The learning component 120 may compile the aforementioned data into baselines, thresholds, expected behavior, etc. In one or more embodiments, the learning component 120 may utilize industry standards or business practices which may not necessarily be associated with accounts of a particular user or entity.

For example, the learning component 120 may track that a set of authentication credentials are generally utilized to generate or initiate an average number of sessions over a time period or predetermined time period. Here, the learning component 120 may generate a threshold associated with the number of sessions which may be initiated before the security component 140 takes actions, such as denying additional sessions, for example. In other words, if an established threshold associated with an established session behavior profile is exceeded, the security component 140 may take action by terminating one or more of the sessions or by denying one or more additional sessions (e.g., associated with the same set of authentication credentials).

It will be appreciated that the learning component 120 may build models or session profiles off of data analyzed by the monitoring component 110 which has been deemed non-malicious or substantially similar to existing baseline behavior. For example, when a session rate gradually increases over an extended period of time, (e.g., months or years), the learning component 120 may model session behavior profiles based on the gradual increase for the session rates monitored by the monitoring component 110. However, when anomalous session activity is detected (e.g., an explosion in a number of sessions), such as a number of sessions created (e.g., which may be beyond a number of sessions humanly possible, such as a brute force attack), the learning component 120 may not model session behavior profiles off of such data. Rather, the monitoring component 110 may note or analyze such an occurrence and have the security component 140 take appropriate action, such as denying additional sessions based on a detected common factor between the large number of sessions. As another example, if multiple sessions are created or initiated at multiple geographic locations or sites outside of the session behavior profile, action may be taken by the security component 140 here as well.

The scoring component 130 may calculate a security score for one or more of the entities, one or more authentication credentials, etc. based on a number of sessions initiated from a set of authentication credentials. The security score may be utilized by the security component 140 to determine one or more actions, such as denying one or more additional sessions from being created or initiated or terminating one or more existing sessions associated with an entity or set of authentication credentials.

Generally, applications, such as web applications may perform authentication to determine whether an entity or a user should be granted access to a resource, such as a web-based resource, website, webpage, server, etc. Here, the security component 140 may perform such authentication (e.g., checking to see if a username-password combination is correct to enable access to a resource). Upon authentication or upon presenting a valid username and password, the security component 140 may grant an entity or a user a session identifier or session ID. A session ID may be a string of characters or numbers utilized to identify a session associated with a login, sign-on, sign-in, etc. In one or more embodiments, a session ID may be presented or utilized when authentication is requested to mitigate repetition of prompting an entity or a user of his or her username and password or other authentication credentials.

A resource, such as a server or a website may remember a session ID assigned or associated with a user or entity and enable that user or entity to have access to the resource based on presentation of the session ID. Accordingly, the session ID mitigates a need to provide authentication credentials or username password combinations repeatedly. The monitoring component 110 may receive session ID data as part of the data associated with one or more of the sessions, thus facilitating session management or creation of a barrier or a layer of security between the public or one or more entities and a resource or data stored within a database or storage component of the resource.

When a user or entity connects or accesses a resource, such as a secure website, the entity presents authentication credentials which affirm an identity of the entity. Often, these credentials take the form of a login name or username and password combination, although other types of authentication credentials may be utilized (e.g., biometrics, security questions, etc.). Session management enables a system, such as the system 100, to create a session such that a user may not be required to re-authenticate every time the user or entity wishes to perform an action. In this way, the system 100 for session management ensures that a user or an entity who is connected to a server or resource via a first session is the same user or entity connected to the same resource via a second session. In other words, the system 100 may facilitate achieving a level of confidence that a user or entity connected to a server via a second session is the same individual who logged in originally via a first session or at least an authorized user (e.g., such as a husband or wife of a group of users or individuals who share a common set of username password combinations or authentication credentials).

The security component 140 may identify one or more sessions as anomalous based on data associated with one or more of the sessions and one or more of the session behavior profiles. In other words, the security component 140 may compare current session activity (e.g., the data from one or more sessions or one or more current sessions) with data associated with historical session activity (e.g., from a session behavior profile) to detect or determine anomalous sessions. Again, the monitoring component 110 records, detects, or receives data associated with one or more of the sessions while the learning component 120 may generate one or more session behavior profiles. It will be appreciated that one or more of the session behavior profiles may be generated from one or more previous sessions and stored in a storage component (not shown). Further, the learning component 120 may utilize current behavior or activity from the data of one or more of the sessions to update or evolve one or more of the session behavior profiles. To this end, the security component 140 may identify anomalous sessions based on data analyzed by the monitoring component 110 and a session behavior profile generated by the learning component 120, wherein the session behavior profile may be indicative of expected, anticipated, or baseline behaviors or activity associated with one or more users, one or more entities, etc. sharing a common authentication credential or login information.

In one or more embodiments, the security component 140 may monitor or track differences between the current behavior of a user or entity and baseline or expected behavior or typical activity for that user or corresponding authentication information or login information. For example, the security component 140 may determine an anomaly or that one or more sessions are anomalous based on a web resource access pattern for an individual. Sessions may be anomalous or out of the ordinary based on aspects associated with physical location, time of day, number of sessions, resources accessed, transaction types, transaction amounts, navigation style, mouse click style, navigation paths, etc.

Further, the security component 140 may respond to one or more differences between the current behavior and the baseline behavior (e.g., anomalous behavior) by taking one or more actions. For example, the security component 140 may deny one or more additional session from being opened, initiated, created, etc. when one or more anomalous sessions are identified. The security component 140 may terminate one or more sessions or existing sessions based on identification of one or more anomalous sessions. In other words, the security component 140 may deny sessions associated with an entity based on a detected anomalous session (e.g., having anomalous behaviors, anomalous activity, anomalous patterns for one or more sessions, such as a common origin, etc.). In this way, the security component 140 may determine whether user behavior is malicious or not based on data associated with the user and a session behavior profile.

In one or more embodiments, the security component 140 may deny one or more additional sessions based on an identified anomaly or aspect of an anomalous session. For example, the security component 140 may disable a set of authentication credentials associated with an entity based on an anomaly or aspects which indicate that a session is anomalous. As mentioned, the monitoring component 110 may generate determinations that a session or one or more session are anomalous based on data associated with one or more sessions, such as thresholds, a number of sign-ons, activity in excess of a baseline, etc.

Additionally, the security component 140 may terminate one or more sessions based on an identified anomaly or aspect of an anomalous session. That is, the security component 140 may terminate sessions which have been identified as anomalous while allowing sessions which have been identified as legitimate to remain connected or continue operating. The security component 140 may include mechanisms for stopping, terminating, mitigating, preventing, or shutting down one or more sessions when a user or an entity interacts with a resource in a malicious, anomalous, or otherwise unusual manner (e.g., associated with utilizing a large or greater than threshold amount of system resources). The security component 140 may deny sessions or additional sessions or terminate sessions based on a common pathway, connection, internet protocol (IP) address, authentication between one or more sessions.

The suggestion component 150 may provide one or more suggestions to an entity which facilitate session management. For example, the suggestion component 150 may suggest that a user or entity utilize one or more offline measures (e.g., call a call center) or wait a threshold duration before attempting to initiate one or more sessions. An out of band telephone call or communication may be initiated to one or more entities or parties to inform one or more of the entities or parties of suspected, potential malicious behavior associated with a session or a set of authentication credentials associated with a user.

The communication component 160 may notify or transmit a notification or alert to a third party, generate an email message, send a text message or the like when action is taken by the security component 140. For example, in a typical credit card application scenario, a user or an entity generally applies for few (e.g., one at a time) credit cards at a time. In a scenario where a user or entity applies for a multitude or a large amount of cards (e.g., intended as a denial of service attack), hundreds, or thousands of applications may be initiated. Because no authentication or login is generally required, an entity may utilize bots, scripts, or the like to perpetrate such an attack. In other words, merely access to an application website is required to initiate these kinds of attacks. Here, the monitoring component 110 may monitor, receive, or analyze one or more sessions initiated by an entity. It will be appreciated that in this scenario, the entity is not associated with a username and password or other authentication credential because merely access to the application website is required.

The learning component 120 creates session behavior profiles which may be indicative of baseline, expected, or typical usage, such as one or two applications per day, not thousands at a time. The security component 140 may make a comparison between data associated with the current traffic (e.g., thousands of applications) and an expected usage pattern or session profile (e.g., a few applications at a time). To this end, the security component 140 may deem one or more of the sessions as anomalous and determine one or more commonalities between one or more of the sessions. Examples of commonalities or common traits or aspects may include a common pathway, IP address, a timing of sessions, etc. In one or more embodiments, the security component 140 may disable access to the resource or website based on incoming session requests associated with one or more of the commonalities or common aspects. In this way, additional sessions for credit card applications may be mitigated or existing sessions may deemed not legitimate or malicious may be terminated. The communication component 160 may transmit or send a notification to one or more entities or one or more parties, such as the information technology (IT) department managing the website or individuals associated with one or more of the mass of applications.

In other embodiments, the security component 140 may play a hold on unusual or anomalous transactions. Further, the communication component 160 may contact a user associated with an account on which an unusual transaction is attempted. In other words, a user may be contacted if an account compromise appears to be in progress or attempted. Additionally, the suggestion component 150 may suggest one or more actions a user may take to reduce risk of fraud or account hijacking, such as not giving out confidential information to entities claiming to be authoritative (e.g., a bank), personally typing in a web address and checking the address bar (e.g., rather than clicking links) before entering financial information, protecting a computer or a device with antivirus software, utilizing a secure password having a length greater than a threshold amount of characters, etc.

Figure 2:
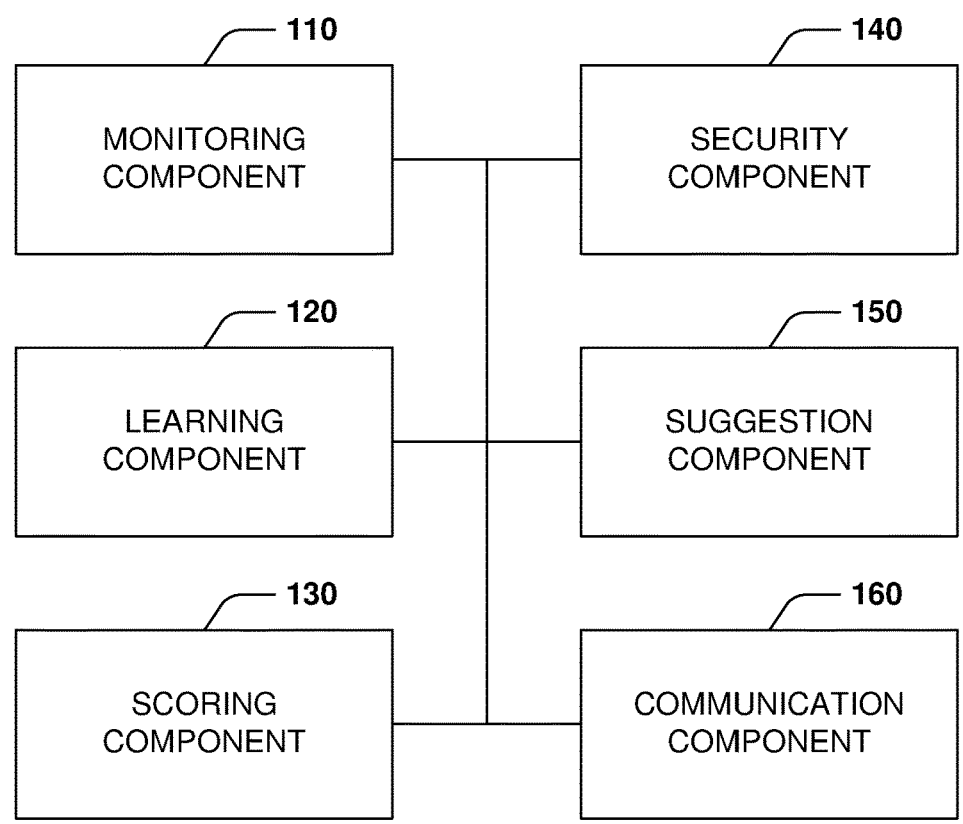
FIG. 2 is an illustration of an example schematic diagram of a system for security scoring, according to one or more embodiments.

FIG. 2 is an illustration of an example schematic diagram of a system 200 for security scoring, according to one or more embodiments. The system 200 may include a monitoring component 110, a learning component 120, a scoring component 130, a security component 140, a suggestion component 150, and a communication component. A security score may be generated by analyzing data associated with a user or data associated with one or more interactions between a user and a resource. A resource may be a web based resource, a website, a server, etc. The security score may be calculated based on the data associated with the user or data indicative of one or more of the interactions between the user and the resource. In this way, a security score may be provided to a user or an entity.

The monitoring component 110 may gather, collect, or analyze data, metrics, characteristics, attributes, etc. associated with one or more aspects of a user, one or more aspects of a resource, or one or more interactions between a user and a resource, transactions performed by a user, session attributes, a location of a user, etc. Data may include one or more user selected attributes, one or more configuration attributes, one or more user actions, or one or more trends. For example, user selected attribute data may include usernames, passwords, authentication credentials, credentials, or one or more aspects thereof, such as length, number of special characters, number of capitalized characters, shift, control, etc. Configuration attribute data may include browser type, access mode, device type, browser version, IP address, device ID, unique IDs, secure versus unsecure network, network attributes, type of encryption, etc. User interaction data may include navigation paths, utilization of hyperlinks, browsing history or pages visited within a network or outside of a network, activity pattern, behaviors, actions, habits, behaviors, transactions conducted, physical location, etc.

Further, data may include information regarding potential threats, current trends for threats, etc. For example, a first vulnerability and a second vulnerability may exist. If malware generally takes advantage of the second vulnerability rather than the first vulnerability, a user utilizing software associated with the second vulnerability may be assigned a lower score than a user utilizing software associated with merely the first vulnerability. This data may be collected or gathered from one or more sources, such as a device being utilized by a user or from the resource being accessed by a user, for example. Another example of a source may be a relationship a vendor has with a user or customer. Other examples of metrics or data may include where a customer or user is navigating from, such as an internet protocol or IP address, a location associated with a device, a physical location, a method of access, or commonly exploited aspects available to fraudsters or hackers with regard to a particular user.

As an example, if a virus is going around which takes advantage of a first browser over a second browser, a customer or user utilizing a device merely installed with the first browser may be associated a lower score or assigned a security score based on the first browser being installed on the device. In one or more embodiments, the monitoring component 110 may track a primary or most utilized browser and generate a security score based on the primary browser or browsing choice of the user.

The monitoring component 110 may determine a number of individuals utilized or sharing one or more credentials. For example, when a husband and wife share bank account information, the monitoring component 110 may notate that two different usage patterns exists for the same set of credentials and create a dichotomy accordingly. In this way, the monitoring component 110 may track usage or profile one or more users even when two or more of the users share username and passwords or other authentication information. It will be appreciated that in this example, the husband and wife may login or interact with a resource such as a banking website in different ways. For example, the husband may utilize hyperlinks more often than the wife. As another example, the wife may type in the address bar more than the husband. Further, the couple may access the resource using different devices, the same device, or a combination thereof. Regardless, the monitoring component 110 may bin activity into different categories for a single set of authentication credentials. In this way, the monitoring component 110 may distinguish one or more users sharing login credentials or the like. In any event, the monitoring component 110 may identify a user by analyzing information, data, metrics, or characteristics associated with a transaction, a session or most any data associated with the interaction of a user with a resource.

The scoring component 130 may calculate a security score or provide a security score to a user or an entity based on data associated with a user, a resource, one or more interactions between the user and the resource, one or more trends, etc. A security score may be indicative of how secure a user is while utilizing a credit card, conducting one or more transactions, making one or more interactions with an account, such as a financial account, how secure a relationship between the user and a financial institution is, how secure a specific or particular interaction or transaction is, or a level of security associated with one or more interactions made by a user or customer as to an account or a resource. In other words, data associated with user interaction with a resource may be analyzed or utilized to calculate a security score that is indicative of a level of security associated with the user's interactions with the resource. In one or more embodiments, data may include user selected attributes, configuration attributes, user actions, or trends.

The learning component 120 may observe one or more patterns or commonalities in a general population of users or customers to determine which factors, characteristics, attributes, etc. contribute to or affect security. In other words, the learning component 120 may tune the formula for calculating a security score based on current events, malware, trends, etc. The learning component 120 may utilize predictive modeling to adjust the formula for the security score or to weigh one or more factors or attributes accordingly. In this way, the learning component 120 may facilitate anticipation of threats, risks, attacks, allocation of resources, preparing for future threats, prioritize threats, etc.

In other embodiments, the learning component 120 may leverage historical data associated with a user, such as usage patterns or how secure a user historically is to facilitate security scoring. The learning component 120 may monitor or track changes in usage patterns for users or customers and adapt the security score accordingly. This way, the learning component 120 may anticipate how a user should behave and compare this with how a hacker or fraudster may behave or reconcile the two behaviors.

The security component 140 may take action if a security score is below a threshold level. The suggestion component 150 may suggest one or more ways or one or more actions or one or more suggested actions a user or customer may take to increase his or her security score. In other words, the suggestion component 150 may generate one or more security score improvement strategies based on factors detected by the learning component 120 or the monitoring component 110. As an example, the suggestion component 150 may provide suggestions to mitigate security breaches, such as prior to a user logging onto a website or launching an app, prior to a user initiating a transaction, etc. The suggestion component 150 may provide warnings that one or more anticipated actions associated with a user may lower his or her security score.

One or more of the suggested actions may include changing a username, changing a password, changing a browser setting, utilizing a different browser or a different application, changing devices, limiting footprint, disabling cookies, signing onto a secured wireless network, encryption settings, adding additional levels of authentication or security, etc. The communication component may notify a user or an entity of a security score or changes which may affect the security score.

Figure 3:
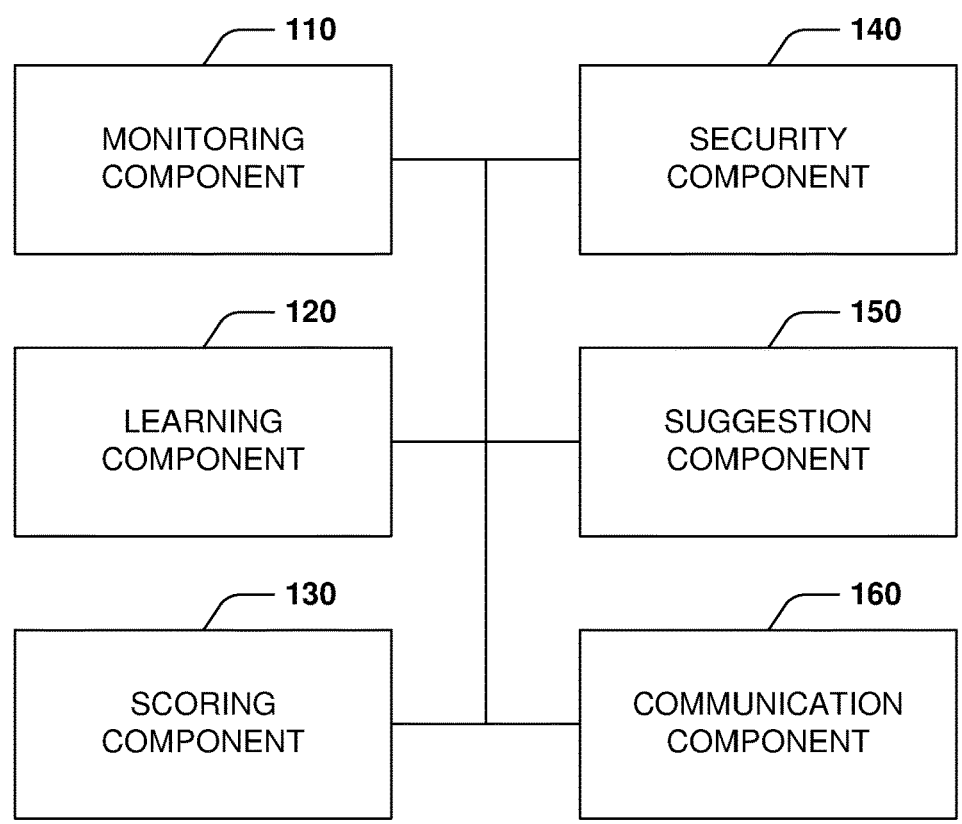
FIG. 3 is an illustration of an example schematic diagram of a system for friction management, according to one or more embodiments.

FIG. 3 is an illustration of an example schematic diagram of a system 300 for friction management, according to one or more embodiments. The system for friction management may include a monitoring component 110, a learning component 120, a scoring component 130, a security component 140, a suggestion component 150, and a communication component 160. The monitoring component 110 may receive one or more attributes or data associated with traffic of one or more users. The traffic may be between one or more users and a resource. In other words, the monitoring component 110 may receive data associated with traffic from a first user. The traffic associated with the first user may be between the first user and a resource.

A security component 140 may offer the first user or other users opportunities to layer or opt into additional levels of security. For example, additional levels of security may include secondary authentications, security questions, etc. Additionally, the monitoring component 110 may also receive data associated with traffic from a second user, where the second user is not enrolled in additional levels of security or opts out of the additional levels of security. Similarly, the traffic associated with the second user may be between the second user and a resource (e.g., the same resource being accessed by the first user). In one or more embodiments, the resource may be a website, a server, an application, etc. Additionally, data associated with traffic of a user may include internet protocol address information of a user.

The monitoring component 110 may deem or classify traffic in one or more categories. For example, the monitoring component 110 may deem or classify traffic as malicious, non-malicious, or unknown. This may be achieved by having the monitoring component 110 classify, deem, or make determinations based on user behavior, user activity, a traffic pattern associated with a user, a consistency score, etc. For example, the monitoring component 110 may deem traffic as non-malicious based on a scenario where a user accesses a resource in a consistent manner. The monitoring component 110 may determine that a usage pattern or traffic associated with a user is consistent if a user accesses a resource, such as a website, generally from the same place, within a similar time window or a predictable time window, from the same internet protocol (IP) address or a set of IP addresses, from a same bookmark, utilizing the same browser, etc. In this way, the monitoring component 110 may deem or classify traffic of a user or associated with a user. Explained another way, the monitoring component 110 may deem traffic associated with a user as non-malicious based on user behavior, user activity or traffic where a user has a usage pattern within a threshold range. For example, the monitoring component 110 may deem traffic non-malicious when the user accesses a website from not more than a threshold number of IP addresses, such as five unique IP addresses within a predetermined time frame.

Conversely, the monitoring component 110 may deem or classify traffic associated with a user or one or more users as malicious based on data, characteristics, or attributes as discussed herein. For example, the monitoring component 110 may deem traffic malicious when the user accesses a website from more than a threshold number of IP addresses, such as twenty five unique IP addresses within a predetermined time frame. As another example, the monitoring component 110 may deem traffic as malicious based on a volume of resource consumed by traffic or corresponding requests. In the banking industry, for example, the monitoring component 110 may track activity such as repetitive transfers (e.g., 'penny' transfers or transfers of small amounts of money repetitively) or other activity which consumes a large volume of system resources. In these scenarios, the security component 140 may impose a limit on a number of transfers to mitigate such activity (e.g., thereby creating a rule for session management).

In other words, if the monitoring component 110 notices that traffic associated with a user or a group (e.g., one or more users) occupies an amount of bandwidth greater than a threshold bandwidth, or that system resources are low (e.g., less than a threshold level) due to activity, traffic, or usage associated with one or more users, a group (e.g., defined by one or more common attributes between one or more users, accounts, or the like), etc., the monitoring component 110 may thus deem corresponding traffic as malicious. Explained another way, the monitoring component 110 may analyze a capacity of a system utilized by an entity, a user, a set of credentials, a login, a username-password combination, etc. and deem or classify corresponding traffic accordingly. The capacity may be analyzed over a time frame or predetermined time frame.

The monitoring component 110 may deem traffic as malicious based on a scenario where a user accesses a resource in an inconsistent manner or inconsistent with a profile associated with the user or an account. As an example, the monitoring component 110 may determine traffic associated with a user is inconsistent based on threshold values, standard deviations, etc. Explained another way, if traffic associated with a user is detected to utilize a greater amount of resources than a threshold value (e.g., a standard deviation more than an average usage amount, a usage amount associated with a profile of the user, etc.), the monitoring component 110 may deem traffic associated with the user as malicious. Other examples of attributes, characteristics, features, data, etc. associated with malicious traffic may include signatures, such as an origin or traffic, a volume of traffic, volume of similar traffic (e.g., sharing one or more common characteristics), an internet protocol (IP) address, timing of traffic, etc.

In one or more embodiments, the monitoring component 110 may track one or more characteristics which may be indicative of how a user interacts with a resource, such as a website or a server. For example, the monitoring component 110 may track how quickly or an elapsed time it takes for a user to navigate from a first point within a resource to a second point within the resource (e.g., a first point in a website or a second point in a website, or a navigation sequence from a first point to a second point when multiple navigation routes exist between the first point and the second point). The monitoring component 110 may track how quickly a user clicks, a number of actions per minute (APM) of a user, the way, path, route, etc. a user takes through an interface, application, or website.

The learning component 120 may identify one or more users, one or more habits associated with one or more of the users, or authentication credentials associated with one or more of the users for the system 100. For example, the learning component 120 may identify one or more users based on data, attributes, characteristics, etc. associated with traffic of one or more of the users. The learning component 120 may identify one or more of the users based on a security profile of a user, which may be indicative of historical behavior of the user or include one or more risk factors associated with the user. Further, the security component 140 may apply friction based on a risk assessment or one or more of the risk factors associated with a user or a respective user of one or more users.

As the learning component 120 identifies one or more users or one or more authentication credentials associated with one or more users (e.g., based on usage patterns, etc.), the learning component 120 may have the security component 140 remove one or more layers of security for one or more of the users. In other words, as the learning component 120 becomes familiar with a user, 'friction' or layers of security may be managed such that a user may be required to engage in less security measures based on the familiarity of the learning component 120 with the user. Explained yet in another way, 'friction' applied by the security component 140 may be inversely proportional to the familiarity the learning component 120 has with a user. Here, the learning component 120 may identify a user based on a usage pattern, characteristic, or attribute associated with traffic of the user. The security component 140 may be tuned to apply more or less 'friction' (e.g., security measures, layers of security, levels of security, etc.) accordingly (e.g., in the previously described inverse proportional manner).

For example, when the monitoring component 110 receives traffic associated with a user, which indicates or is indicative of consistent activity or usage in a consistent manner, the learning component 120 may identify the user with a greater degree of confidence based on usage activity or attributes related to access or traffic. The learning component 120 may have the security component 140 implement fewer or less security measures than a current state or current security measure scheme. Conversely, if the monitoring component 110 receives traffic which is indicative of inconsistent activity, suspicious activity, activity outside a threshold usage pattern of a user, etc., the learning component 120 may have the security component 140 implement additional security measures, even when a user has already passed one or more or several security measures, security questions, etc. In other words, the security component 140 may apply friction or additional friction (e.g., security measures) after access has already been granted to an account based on suspicious activity.

As an example, if a user has his or her ATM card and ATM PIN stolen (e.g., by a fraudster), the fraudster may insert the ATM card of the user into an ATM, and enter the correct, stolen ATM PIN to gain access to the user's funds. However, the monitoring component 110 may monitor traffic associated with the user, which in this example, may be transactions attempted by the fraudster who is posing as the user. If the fraudster attempts suspicious activity, the learning component 120 may compare attempted activities against a usage profile of the user and have the security component 140 react accordingly. For example, if the user typically utilizes a specific ATM, and the fraudster attempts to withdraw funds from a different ATM, the security component 140 may apply friction, capture an image from the ATM (e.g., of an individual attempting to withdraw funds) or take additional security measures based on the use of a different ATM. If the fraudster attempts to withdraw a daily maximum, drain the account, etc., the learning component 120 may have the security component 140 apply additional friction as well.

As another example, if an upper level executive or manager who has access to sensitive information (e.g., account information of one or more individuals, balances, etc.) who typically doesn't access such information on a day-to-day basis begins siphoning, viewing, accessing, etc. large quantities of such data or above a threshold amount of such data, as tracked by the monitoring component 110 and/or learning component 120, the security component 140 may apply friction accordingly. For example, the security component 140 may log the user associated with credentials of the manager out and apply different or additional security questions for that set of user credentials upon a login attempt for that set of credentials. The security component 140 may thus notify the information technology (IT) department (e.g., by email, text, or other alert).

As yet another example, if a user typically utilizes a banking website or resource to check a balance of an account (e.g., as tracked by the learning component 120), but initiates a transfer (e.g., as monitored by the monitoring component 110), the security component 140 may apply friction or require the user to provide an answer to a security question or otherwise pass through one or more security measures prior to allowing the user to make the transfer.

As previously discussed, the scoring component 130 may calculate a security score for a user or a respective user of one or more users based on a mode of access to a resource. This provides a risk assessment for one or more users based on usage patterns of a user (e.g., which may include mode of access). For example, if a user typically utilizes a first browser (e.g., detected by the monitoring component 110), the learning component 120 may observe this behavior and create a profile associated with the user. The monitoring component 110 may continue to monitor traffic associated with the user. If usage for the user does not evolve in a natural manner, the scoring component 130 may issue a security score which reflects a state of the traffic in comparison with expected traffic, as indicated by the profile.

For example, if the user utilizes a first browser in a consistent manner, but additional or excessive usage is detected which is associated with a second browser, the scoring component 130 may issue a low or lower security score based on excessive usage associated with the second browser. Here, it may be presumed that credentials associated with the user may have been compromised due to the activity associated with the second browser. To this end, the security component 140 may take action, such as by throttling or limiting access to a resource the traffic is attempting to reach. In other words, the security component 140 may apply friction or additional layers of security in response to a change in a traffic pattern (e.g., utilization of a first browser shifting to utilization of a second browser).

However, in a scenario where a first user and a second user share an account or login credentials, usage associated with the second browser may not be indicative of malicious activity. For example, a husband and wife may share login credentials to an account, such as a bank account, and the husband may utilize a first browser or have a first mode of access to a resource, such as a banking website, while the wife may utilize a second browser or have a second mode of access to the resource. Here, the security component 140 may perform additional verification and profile usage accordingly (e.g., once the account of the husband and wife has been verified or it is known that two or more users access the account).

The security component 140 may provide one or more users one or more opportunities to layer one or more additional levels of security between a respective user of one or more of the users and a resource. In other words, the security component 140 may add one or more additional levels of authentication between a user and a resource. For example, a user may achieve additional levels of security by sending a request for enrollment to the security component 140. In this way, the security component 140 may receive a request for enrollment in one or more additional levels of security from a user, such as a first user. In response to the request, the security component 140 may apply one or more additional levels of security to one or more users (e.g., the first user) based on the request for additional security. In this way, the security component 140 may enable one or more users to opt in or opt out of one or more additional levels of security. Explained another way, the security component 140 may manage security or one or more additional levels of security based on identification of one or more users, as facilitated by the monitoring component 110 or profiling by the learning component 120.

When a user enrolls or opts into additional levels or security or additional security, the system 100 may fast pass the user (e.g., bypass one or more additional levels of security) based on the enrollment of additional security when suspicious activity is detected or create a higher or different threshold for individuals enrolled or opted into the additional levels of security, which may act as a security prescreen, for example. Others or other individuals who have opted out or are not participating in the additional levels of security may experience additional friction or security measures at lower or different thresholds than the individuals who have opted in or are participating in the heightened security program.

Further, the security component 140 may interact with the communication component 160 to have the communication component 160 prioritize traffic for different users based on enrollment in additional security or participation in a heightened security program. For example, the security component 140 may prioritize traffic for a first user who is enrolled in additional security over traffic for a second user who is not enrolled in any additional security. In other words, the security component 140 may reward a user who has chosen a higher level of security with more resource allocation, bandwidth, service allocation, "guaranteed" access, etc. Stated another way, the security component 140 may have the communication component 160 throttle users based on participation (or lack of participation) in security programs, password change suggestions, device authentication, additional security questions, etc. In one or more embodiments, a set of rules or business rules may be provided such that low risk individuals, accounts, customers, etc. are automatically rewarded with additional resources, bandwidth, etc.

In one or more embodiments, the security component 140 may automatically apply friction or additional levels of security to one or more users or associated credentials based on data associated with corresponding traffic for one or more of the users (e.g., suspicious traffic or suspicious activity, exceeding a threshold withdrawal amount, etc.).

Further, heightened security may be applied based on an attempted transaction, an amount of a transaction, an amount of data consumed, etc. For example, if a username and password of a high level user, such as a super user, are stolen, a thief or fraudster may gather large amounts of information, to use or sell on the black market. Here, the monitoring component 110 may detect usage outside of a profiled usage pattern or an unexpected usage pattern and may prompt the user (e.g., fraudster in this example) for additional information even after the proper username and password have been supplied. In other words, the monitoring component 110 may monitor sets or subsets of data accessed or attempted access by an entity or purported entity. Explained yet another way, the monitoring component 110 may track consumption of data (e.g., data associated with a session may be indicative of data consumed, attempted consumption, areas of access, etc.).

As another example, a first security measure may be applied (e.g., via the security component 140) for a first level of access to an account, such as viewing a balance. A second security measure may be applied when an action is attempted, such as a transfer of funds or drilling into account details. A third security measure may be applied when a different action is attempted, such as transfer of funds over a predetermined threshold. The predetermined threshold may be based on historical account activity of the user. For example, if the user utilizes an account to pay monthly bills, the predetermined threshold may be based on a corresponding monthly average.

The suggestion component 150 may guide the way a user comes or navigates into a site or a resource and suggest more secure alternatives. For example, a monitoring component 110 may determine that a user accesses a resource or website by clicking a hyperlink. The scoring component 130 may score hyperlink access lower than access to the resource associated with utilizing a bookmark. To this end, the suggestion component 150 may suggest that the user utilize a bookmark instead of a hyperlink, for example. Other suggestions may include searching, bookmarking, typing in a URL bar, clicking a link, suggesting a path, notifying a user of one or more associated security scores, etc.

The communication component 160 may manage traffic between one or more users and a resource. Traffic may be managed based on data associated with the traffic for a respective user or one or more additional levels of security between a respective user and a resource. In other words, when a user enrolls in a security program or utilizes or layers one or more additional levels of security between himself or herself and a resource, such as a website, the communication component 160 may favor traffic of that user over others who have not enrolled, for example. In this way, the communication component 160 may manage traffic between respective users and resources.

Further, the communication component 160 may manage traffic based on a security score of a user or respective user of one or more users. In other words, the communication component 160 may promote, favor, prioritize, manage, etc. traffic by placing traffic of a first user associated with a first security score in front of traffic of a second user associated with a second security score. For example, if a first user opts into one or more additional levels of security, that first user may be assigned a higher transfer of funds threshold than a second user who opted out or declined one or more additional levels of security. In one or more embodiments, additional levels of security or authentication may be implemented by the security component 140 based on a low security score.

It will be appreciated that the security score may be influenced or impacted by enrollment in additional levels or security, security protocols, security measures, etc. In one or more embodiments, the communication component 160 may manage traffic from a first user and traffic from a second user based on additional levels of security between one of the users and the resource. For example, if the first user is enrolled in additional levels of security and the second user is not enrolled in additional levels of security, the communication component 160 may throttle or slow down traffic for the second user, such as by inserting a delay.

The communication component 160 may throttle services (e.g., limit transactions) based on an amount of security, type of device a user is utilizing, a method of access, mode of access, security score, etc. The communication component 160 may slow or throttle traffic between a user and a resource by implementing a delay between the user and associated traffic (e.g., placing the user in a time box) or prioritizing the user in front of or behind other users.

Figure 4:
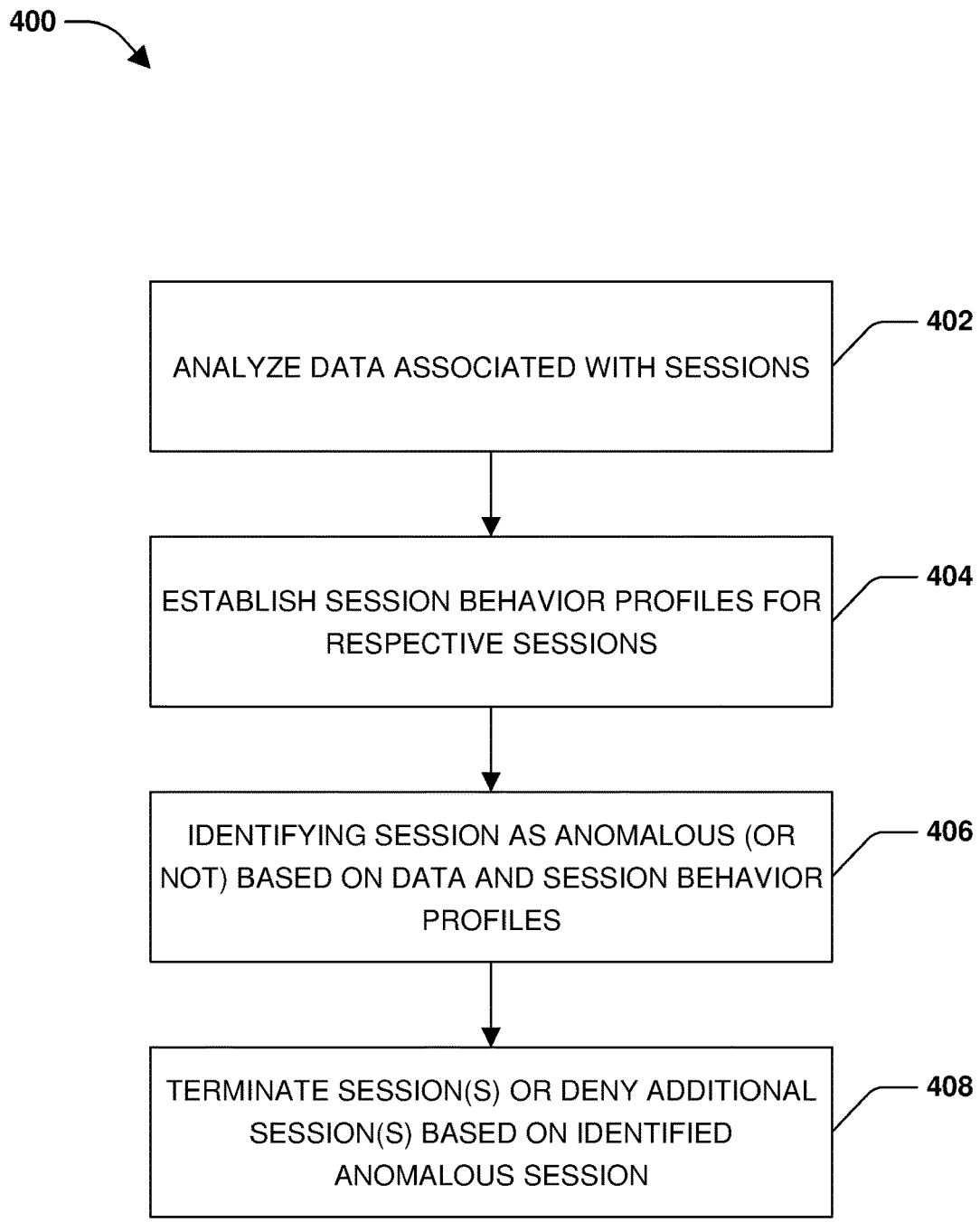
FIG. 4 is an illustration of an example flow diagram of a method for session management, according to one or more embodiments.

FIG. 4 is an illustration of an example flow diagram of a method 400 for session management, according to one or more embodiments. At 402, data associated with one or more sessions or traffic of one or more sessions may be received or analyzed. At 404, one or more session behavior profile may be established or generated for one or more respective sessions. In one or more embodiments, session behavior profiles may be generated based on prior history. At 406, one or more sessions may be identified or classified as anomalous based on the data and a session behavior profile (e.g., by comparing the two). At 408, one or more sessions may be terminated or one or more additional session may be denied based on an identified anomalous session or one or more commonalities between one or more sessions identified as malicious or anomalous.

Figure 5:
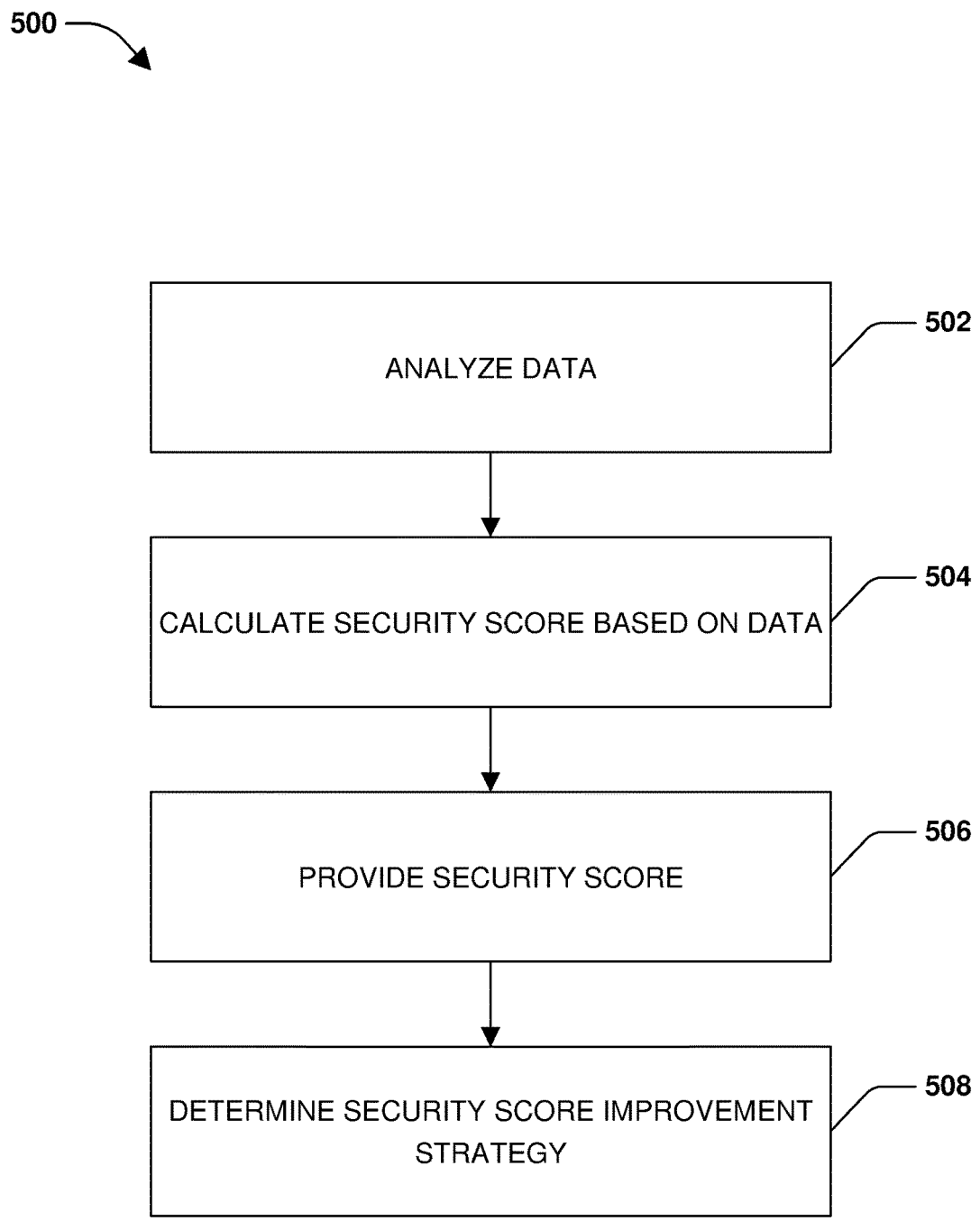
FIG. 5 is an illustration of an example flow diagram of a method for security scoring, according to one or more embodiments.

FIG. 5 is an illustration of an example flow diagram of a method 500 for security scoring, according to one or more embodiments. At 502, data associated with one or more interactions between a user and a resource may be analyzed. At 504, a security score may be calculated based on data associated with one or more of the interactions. At 506, the security score may be provided. At 508, one or more suggested actions or a security score improvement strategy may be generated such that implementation of at least some of the same would increase the security score.

Figure 6:
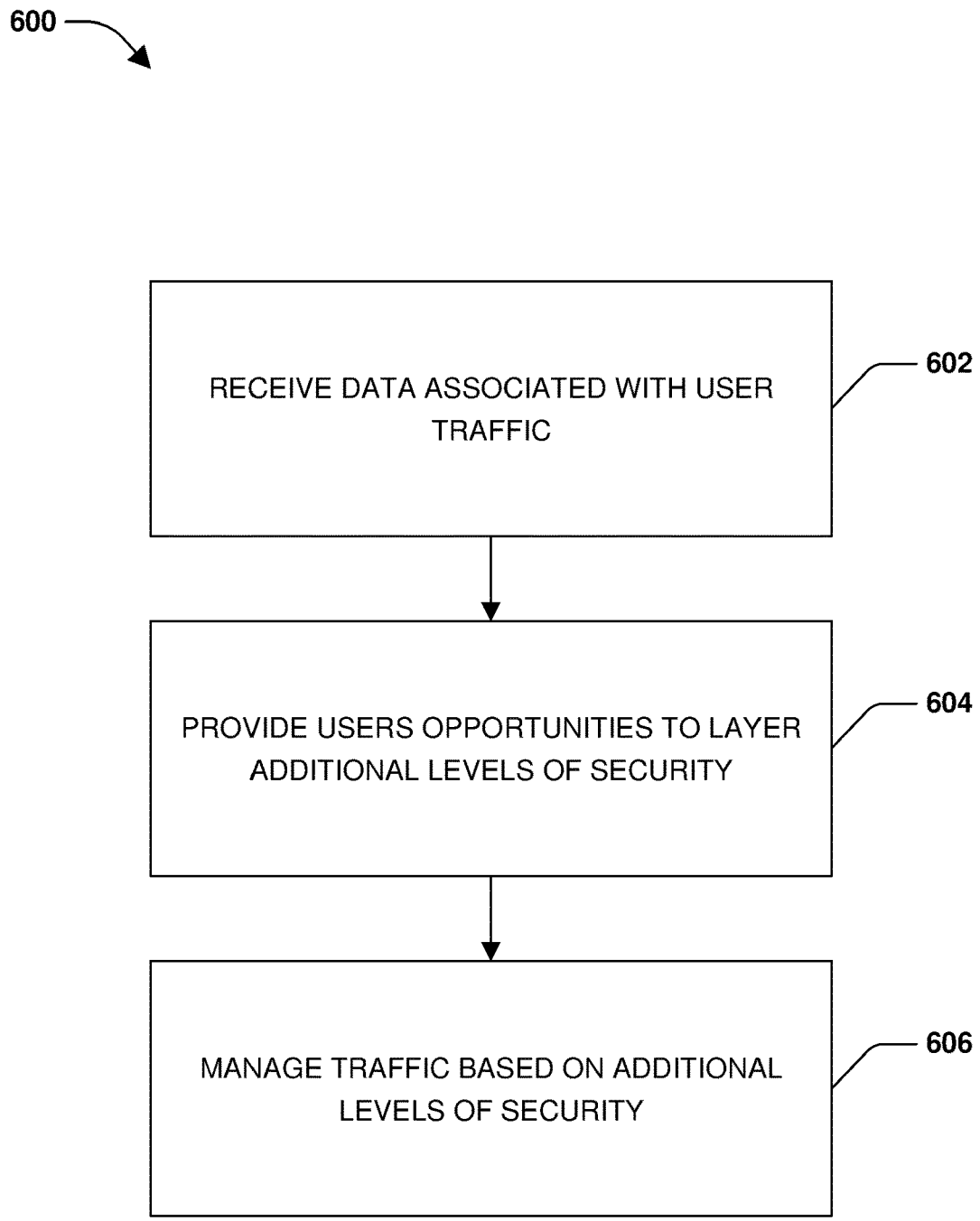
FIG. 6 is an illustration of an example flow diagram of a method for friction management, according to one or more embodiments.

FIG. 6 is an illustration of an example flow diagram of a method 600 for friction management, according to one or more embodiments. At 602, the method 600 includes receiving data associated with traffic of one or more users, wherein the traffic is between one or more of the users and a resource. At 604, the method 600 includes providing one or more of the users one or more opportunities to layer one or more additional levels of security between a respective user of one or more of the users and the resource. At 606, the method 600 includes managing the traffic between the respective user and the resource based on the data associated with traffic for the respective user or one or more of the additional levels of security between the respective user and the resource.

Figure 7:
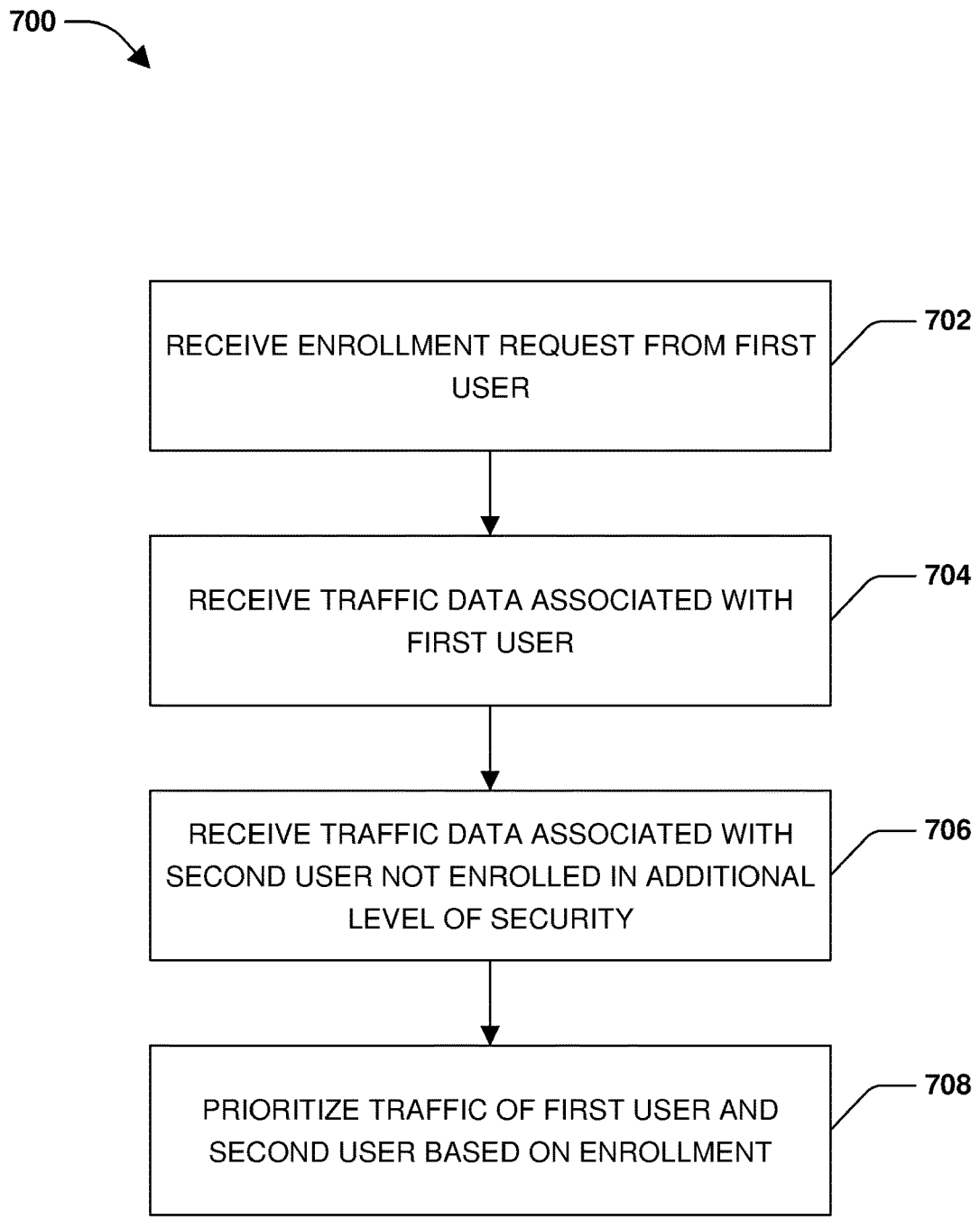
FIG. 7 is an illustration of an example flow diagram of a method for friction management, according to one or more embodiments.

FIG. 7 is an illustration of an example flow diagram of a method 700 for friction management, according to one or more embodiments. At 702, a request for enrollment in one or more additional levels of security may be received from a first user. At 704, data associated with traffic from the first user may be received, wherein the traffic of the first user is between the first user and a resource. At 706, data associated with traffic from a second user may be received, wherein the traffic of the second user is between the second user and the resource. At 708, traffic from the first user and the traffic from the second user may be prioritized based on one or more of the additional levels of security between the first user and the resource.

One or more embodiments may employ various artificial intelligence (AI) based schemes for carrying out various aspects thereof. One or more aspects may be facilitated via an automatic classifier system or process. A classifier is a function that maps an input attribute vector, $x=(x1, x2, x3, x4, xn)$, to a confidence that the input belongs to a class. In other words, $f(x)$=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

Figure 8:
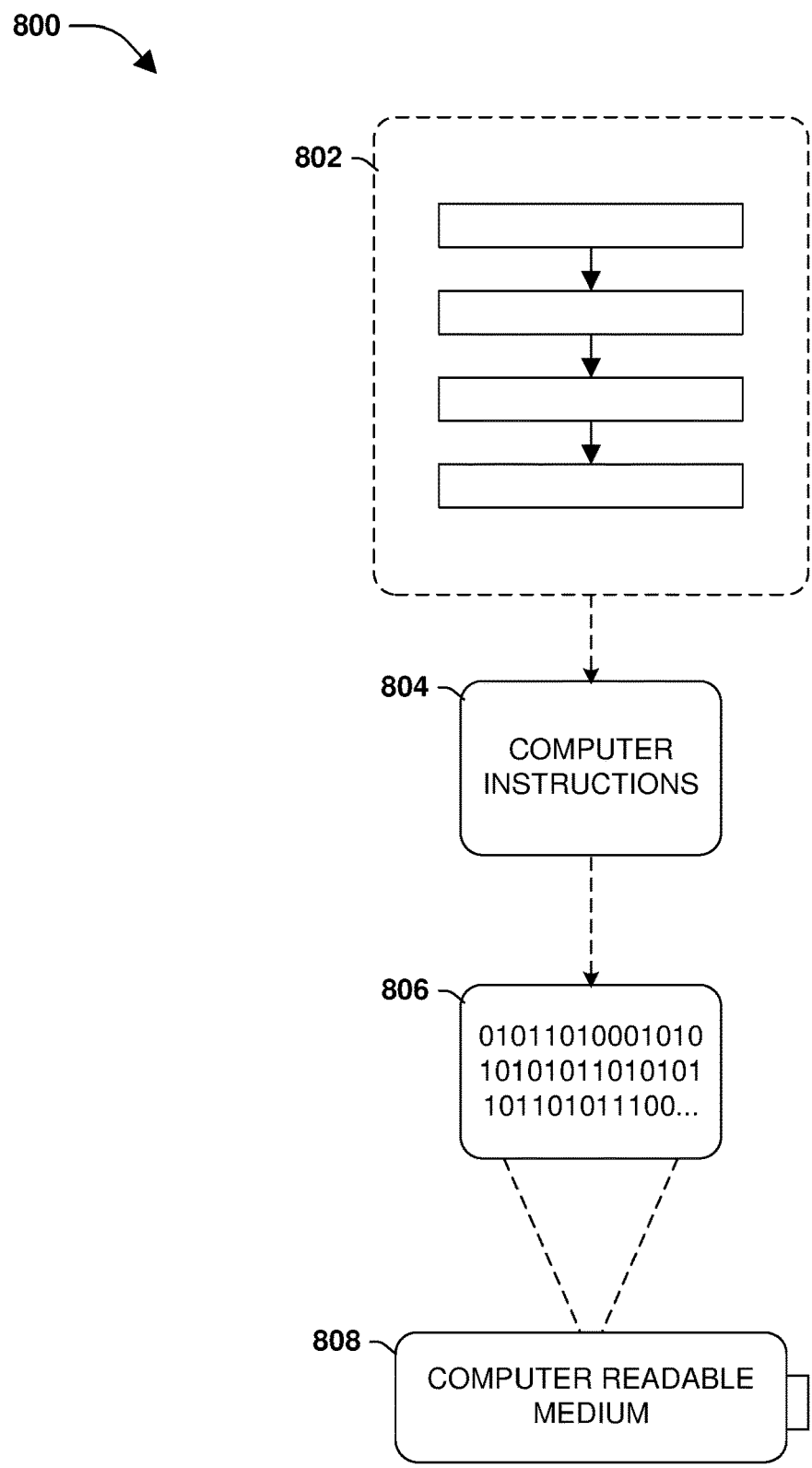
FIG. 8 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 8, wherein an implementation 800 includes a computer-readable medium 808, such as a CD-R, DVD-R, flash drive, a platter of a hard disk drive, etc., on which is encoded computer-readable data 806. This computer-readable data 806, such as binary data including a plurality of zero's and one's as shown in 806, in turn includes a set of computer instructions 804 configured to operate according to one or more of the principles set forth herein. In one such embodiment 800, the processor-executable computer instructions 804 may be configured to perform a method 802, such as the method 400 of FIG. 4, the method 500 of FIG. 5, the method 600 of FIG. 6, or the method 700 of FIG. 7. In another embodiment, the processor-executable instructions 804 may be configured to implement a system, such as the system 100 of FIG. 1, the system 200 of FIG. 2, or the system 300 of FIG. 3. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 9 and the following discussion provide a description of a suitable computing environment to implement embodiments of one or more of the provisions set forth herein. The operating environment of FIG. 9 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 9 illustrates a system 900 including a computing device 912 configured to implement one or more embodiments provided herein. In one configuration, computing device 912 includes at least one processing unit 916 and memory 918. Depending on the exact configuration and type of computing device, memory 918 may be volatile, such as RAM, non-volatile, such as ROM, flash memory, etc., or a combination of the two. This configuration is illustrated in FIG. 9 by dashed line 914.

In other embodiments, device 912 includes additional features or functionality. For example, device 912 may include additional storage such as removable storage or non-removable storage, including, but not limited to, magnetic storage, optical storage, etc. Such additional storage is illustrated in FIG. 9 by storage 920. In one or more embodiments, computer readable instructions to implement one or more embodiments provided herein are in storage 920. Storage 920 may store other computer readable instructions to implement an operating system, an application program, etc. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 912. Any such computer storage media is part of device 912.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 912 includes input device(s) 924 such as keyboard, mouse, pen, voice input device, touch input device, infrared cameras, video input devices, or any other input device. Output device(s) 922 such as one or more displays, speakers, printers, or any other output device may be included with device 912. Input device(s) 924 and output device(s) 922 may be connected to device 912 via a wired connection, wireless connection, or any combination thereof. In one or more embodiments, an input device or an output device from another computing device may be used as input device(s) 924 or output device(s) 922 for computing device 912. Device 912 may include communication connection(s) 926 to facilitate communications with one or more other devices.

According to one or more aspects, a system for session management is provided, including a monitoring component, a learning component, and a security component. The monitoring component may analyze data associated with one or more web-based sessions, wherein respective web-based sessions are associated with one or more entities. The learning component may establish one or more session behavior profiles for one or more of the web-based sessions. The security component may identify whether one or more of the web-based sessions is anomalous based on the data associated with one or more of the web-based sessions and one or more of the session behavior profiles. The security component may deny one or more additional web-based sessions based on identifying one or more anomalous web-based sessions.

One or more of the web-based sessions may be concurrent. The system may include a notification component providing a notification based on identifying one or more anomalous web-based sessions. The learning component may dynamically update one or more of the session behavior profiles based on a machine learning technique. The security component may terminate one or more of the web-based sessions based on identifying one or more anomalous web-based sessions. One or more of the web-based sessions may be associated with an authentication credential of a same entity. One or more of the session behavior profiles may include a session pattern, a behavior baseline, or a potentially malicious behavior. A session pattern may include a location, a session rate, a number of sessions, or a session activity. Behavior baseline may include a baseline location, a baseline session rate, a baseline number of sessions, or a baseline session activity associated with one or more of the entities. Potentially malicious behavior may include a denial of service behavior, a brute force behavior, a fraud behavior, or a redirection behavior.

According to one or more aspects, a method for session management is provided, including analyzing data associated with one or more web-based sessions, wherein respective web-based sessions are associated with one or more entities, establishing one or more session behavior profiles for one or more of the web-based sessions, identifying whether one or more of the web-based sessions is anomalous based on the data associated with one or more of the web-based sessions and one or more of the session behavior profiles, and terminating one or more of the web-based sessions based on identifying one or more anomalous web-based sessions.

One or more of the web-based sessions may be concurrent. The method may include dynamically updating one or more of the session behavior profiles based on a machine learning technique. One or more of the web-based sessions may be associated with an authentication credential of a same entity. One or more of the session behavior profiles may include a session pattern, a behavior baseline, or a potentially malicious behavior. The session pattern may include a location, a session rate, a number of sessions, or a session activity.

One or more aspects may provide for analyzing data associated with one or more web-based sessions, wherein respective web-based sessions are associated with one or more entities, establishing one or more session behavior profiles for one or more of the web-based sessions, identifying whether one or more of the web-based sessions is anomalous based on the data associated with one or more of the web-based sessions and one or more of the session behavior profiles, denying one or more additional web-based sessions based on identifying one or more anomalous web-based sessions, or dynamically updating one or more of the session behavior profiles based on a machine learning technique. Further, one or more of the web-based sessions may be concurrent or one or more of the web-based sessions may be associated with an authentication credential of a same entity.

According to one or more aspects, a system for scoring security is provided, including a monitoring component, a scoring component, and a suggestion component. The monitoring component may receive data associated with one or more interactions between a user and a resource. The scoring component may calculate a security score based on the data associated with one or more of the interactions. The suggestion component may generate one or more suggested actions to improve the security score.

Implementation of one or more of the suggested actions may improve the security score. The security score may include a measure of security associated with one or more of the interactions between the user and the resource. The learning component may analyze one or more security factors which influence the security score of the user or analyze one or more additional security factors which influence security for one or more additional users. The learning component may analyze one or more malicious actions. One or more of the suggested actions may be changing a username, changing a password, disabling one or more cookies, utilizing a secured network, or adding one or more additional levels of security. The monitoring component may receive data associated with one or more user selected attributes, data associated with one or more configuration attributes, or data associated with one or more trends.

According to one or more aspects, a method for scoring security is provided, including receiving data associated with one or more interactions between a user and a resource, calculating a security score based on the data associated with one or more of the interactions, and generating one or more suggested actions to improve the security score.

The method may include analyzing one or more security factors which influence the security score of the user, analyzing one or more additional security factors which influence security for one or more additional users, analyzing one or more malicious actions, receiving data associated with one or more user selected attributes, or receiving data associated with one or more configuration attributes.

According to one or more aspects, receiving data associated with one or more interactions between a user and a resource, calculating a security score based on the data associated with one or more of the interactions, and generating one or more suggested actions to improve the security score is provided. Additionally, analyzing one or more security factors which influence the security score of the user, analyzing one or more additional security factors which influence security for one or more additional users, or analyzing one or more malicious actions is provided.

According to one or more aspects, a system for friction management is provided, including a monitoring component receiving data associated with traffic of one or more users, wherein the traffic is between one or more of the users and a resource, a security component providing one or more of the users one or more opportunities to layer one or more additional levels of security between a respective user of one or more of the users and the resource, and a communication component managing the traffic between the respective user and the resource based on the data associated with traffic for the respective user or one or more of the additional levels of security between the respective user and the resource.

Data associated with the traffic may include internet protocol (IP) address information of one or more of the users. One or more of the additional levels of security may include secondary authentication or a security question. The system may include a scoring component calculating a security score for the respective user based on a mode of access to the resource. The communication component may manage the traffic between the respective user and the resource based on the security score of the respective user. The security component applies an additional level of security to one or more of the users based on the data associated with corresponding traffic for one or more of the users. The security component may enable one or more of the users to opt in or opt out of one or more of the additional levels of security. The system may include a learning component for identifying one or more of the users based on the data associated with traffic of one or more of the users. The security component may manage one or more of the additional levels of security based on identification of one or more of the users. The resource may be a website or a server.

According to one or more aspects, a method for friction management is provided, including receiving data associated with traffic of one or more users, wherein the traffic is between one or more of the users and a resource, providing one or more of the users one or more opportunities to layer one or more additional levels of security between a respective user of one or more of the users and the resource, and managing the traffic between the respective user and the resource based on the data associated with traffic for the respective user or one or more of the additional levels of security between the respective user and the resource.

The data associated with the traffic may include internet protocol (IP) address information of one or more of the users. One or more of the additional levels of security may include secondary authentication or a security question. The method may include calculating a security score for the respective user based on a mode of access to the resource. The method may include managing the traffic between the respective user and the resource based on the security score of the respective user. The method may include applying one or more additional levels of security to one or more of the users based on the data associated with corresponding traffic for one or more of the users.

One or more aspects may provide for receiving a request for enrollment in one or more additional levels of security from a first user, receiving data associated with traffic from the first user, wherein the traffic of the first user is between the first user and a resource, receiving data associated with traffic from a second user, wherein the traffic of the second user is between the second user and the resource, wherein the second user is not enrolled in additional levels of security, and prioritizing the traffic from the first user and the traffic from the second user based on one or more of the additional levels of security between the first user and the resource. Additionally, data associated with the traffic may include internet protocol (IP) address information of the first user or the second user. One or more of the additional levels of security may include secondary authentication or a security question. The resource may be a website or a server.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for session management, comprising:
a processor;
a memory storing instructions that, when executed by the processor, cause the processor to:
determine a session behavior profile for a web-based session associated with an authenticated entity, wherein the session behavior profile establishes a degree of familiarity with the entity;
apply one or more initial security measures to the web-based session based on the degree of familiarity;
identify the web-based session as anomalous based on data associated with the web-based session and the session behavior profile; and
apply one or more additional security measures to the web-based session in response to identification of the web-based session as anomalous.

2. The system of claim 1, wherein the instructions further cause the processor to deny one or more additional web-based sessions based on the identification of the web-based session as anomalous.

3. The system of claim 1, wherein the instructions further cause the processor to provide a notification based on the identification of the web-based session as anomalous.

4. The system of claim 1, wherein the instructions further cause the processor to update dynamically the session behavior profile based on a machine learning technique.

5. The system of claim 1, wherein the instructions further cause the processor to terminate the web-based session based on the identification of the web-based session as anomalous.

6. The system of claim 1, wherein the web-based session is associated with another web-based session with an authentication credential of the same entity.

7. The system of claim 1, wherein the session behavior profile comprising a session pattern, a behavior baseline, or a potentially malicious behavior.

8. The system of claim 7, wherein the session pattern further comprises a location, a session rate, a number of sessions, or a session activity.

9. The system of claim 7, wherein the behavior baseline comprises a baseline location, a baseline session rate, a baseline number of sessions, or a baseline session activity associated with the entity.

10. The system of claim 7, wherein the potentially malicious behavior comprises a denial of service behavior, a brute force behavior, a fraud behavior, or a redirection behavior.

11. A method of session management, comprising:
executing, on a processor, instructions stored in a memory that cause a session management system to:
determine a session behavior profile for a web-based session associated with an authenticated entity, wherein the session behavior profile establishes a degree of familiarity with the entity;
apply one or more initial security measures to the web-based session based on the degree of familiarity;
identify the web-based session as anomalous based on data associated with the web-based session and the session behavior profile; and
apply one or more additional security measures to the web-based session in response to identification of the web-based session as anomalous.

12. The method of claim 11, wherein the instructions further cause the session management system to deny one or more additional web-based sessions for the authenticated entity based on the identification of the web-based session as anomalous.

13. The method of claim 11, wherein the instructions further cause the session management system to terminate the web-based session identified as anomalous after a predetermined session threshold is exceeded.

14. The method of claim 11, wherein the instructions further cause the session management system to update the session behavior profile based on a machine learning technique.

15. The method of claim 11, wherein the session behavior profile comprises a session pattern, a behavior baseline, or a potentially malicious behavior.

16. The method of claim 15, wherein the session pattern comprises a location, a session rate, a number of sessions, or a session activity.

17. A non-transitory computer-readable storage medium comprising computer-executable instructions, which when executed by a processing unit on a computer performs acts, comprising:
determining one or more session behavior profiles for one or more web-based sessions associated with one or more authenticated entities, wherein the one or more session behavior profiles establish a degree of familiarity with the one or more entities;
applying one or more initial security measures to the one or more web-based sessions based on the degree of familiarity;
identifying at least one of the one or more web-based sessions as anomalous based on data associated with the one or more web-based sessions and the one or more session behavior profiles; and
applying one or more additional security measures to the at least one of the one or more web-based sessions in response to identifying the at least one of the one or more web-based sessions as anomalous.

18. The non-transitory computer-readable storage medium of claim 17, further comprising denying one or more additional web-based sessions for at least one of the one or more authenticated entities associated with the at least one web-based session identified as anomalous.

19. The non-transitory computer-readable storage medium of claim 17, further comprising terminating the at least one web-based session identified as anomalous after a predetermined session threshold is exceeded.

20. The non-transitory computer-readable storage medium of claim 17, further comprising dynamically updating one or more of the session behavior profiles based on a machine learning technique.

\* \* \* \* \*